United States Patent [19]

(12) United States Patent
Kang (10) Patent No.: US 7,360,101 B2
(45) Date of Patent: Apr. 15, 2008

(54) APPARATUS AND METHOD FOR CONTROLLING CPU SPEED TRANSITION

(75) Inventor: Seong Cheol Kang, Osan-si (KR)

(73) Assignee: LG Electronics Inc., Seoul (KR)

( * ) Notice: Subject to any disclaimer, the term of this patent is extended or adjusted under 35 U.S.C. 154(b) by 478 days.

(21) Appl. No.: 10/811,849

(22) Filed: Mar. 30, 2004

(65) Prior Publication Data

US 2005/0015633 A1    Jan. 20, 2005

(30) Foreign Application Priority Data

Jul. 14, 2003    (KR) .................... 10-2003-0047852

(51) Int. Cl.
*G06F 1/00* (2006.01)
*G06F 1/26* (2006.01)
*G06F 1/32* (2006.01)

(52) U.S. Cl. .................. 713/300; 713/322; 713/323; 713/324

(58) Field of Classification Search ............... 713/300, 713/322, 323, 324
See application file for complete search history.

(56) References Cited

U.S. PATENT DOCUMENTS 5,623,677 A * 4/1997 Townsley et al. ............ 713/310
5,754,869 A * 5/1998 Holzhammer et al. ....... 713/300
6,112,309 A * 8/2000 Inoue et al. ................. 713/501
6,122,701 A * 9/2000 Kunkel ....................... 710/267
6,192,206 B1 * 2/2001 Peters et al. ................... 399/77
6,802,015 B2 * 10/2004 Atkinson ..................... 713/322
2001/0016892 A1 * 8/2001 Klein .......................... 710/260
2002/0124197 A1 * 9/2002 Atkinson ..................... 713/322
2003/0056123 A1 * 3/2003 Hsieh .......................... 713/300
2003/0226047 A1 * 12/2003 Park et al. ................... 713/300

* cited by examiner

*Primary Examiner*—James K. Trujillo
*Assistant Examiner*—Michael J Brown
(74) *Attorney, Agent, or Firm*—Ked & Associates, LLP (57) ABSTRACT

An apparatus and method for controlling CPU speed transition can use an SMI (System Management Interrupt) signal to perform speed transition of a CPU of a computer such as a notebook computer. However, if the bus master device is in the active state, a control operation needed for CPU speed transition is cancelled at the same time an event signal (e.g., a watchdog SMI or an embedded controller SMI) is created at prescribed intervals and the bus mater device active state is accordingly re-checked. Therefore, when the bus master device is in the active state, the control operation for CPU speed transition is cancelled to prevent the computer from hanging up, and the CPU speed transition control operation is periodically retried to increase a likelihood of a normal CPU speed transition or the normal CPU speed transition can be established.

20 Claims, 6 Drawing Sheets

APPARATUS AND METHOD FOR CONTROLLING CPU SPEED TRANSITION

BACKGROUND OF THE INVENTION

1. Field of the Invention

The present invention relates to an apparatus and method for controlling CPU speed transition, and more particularly to a CPU speed transition.

2. Background of the Related Art

Figure 1:
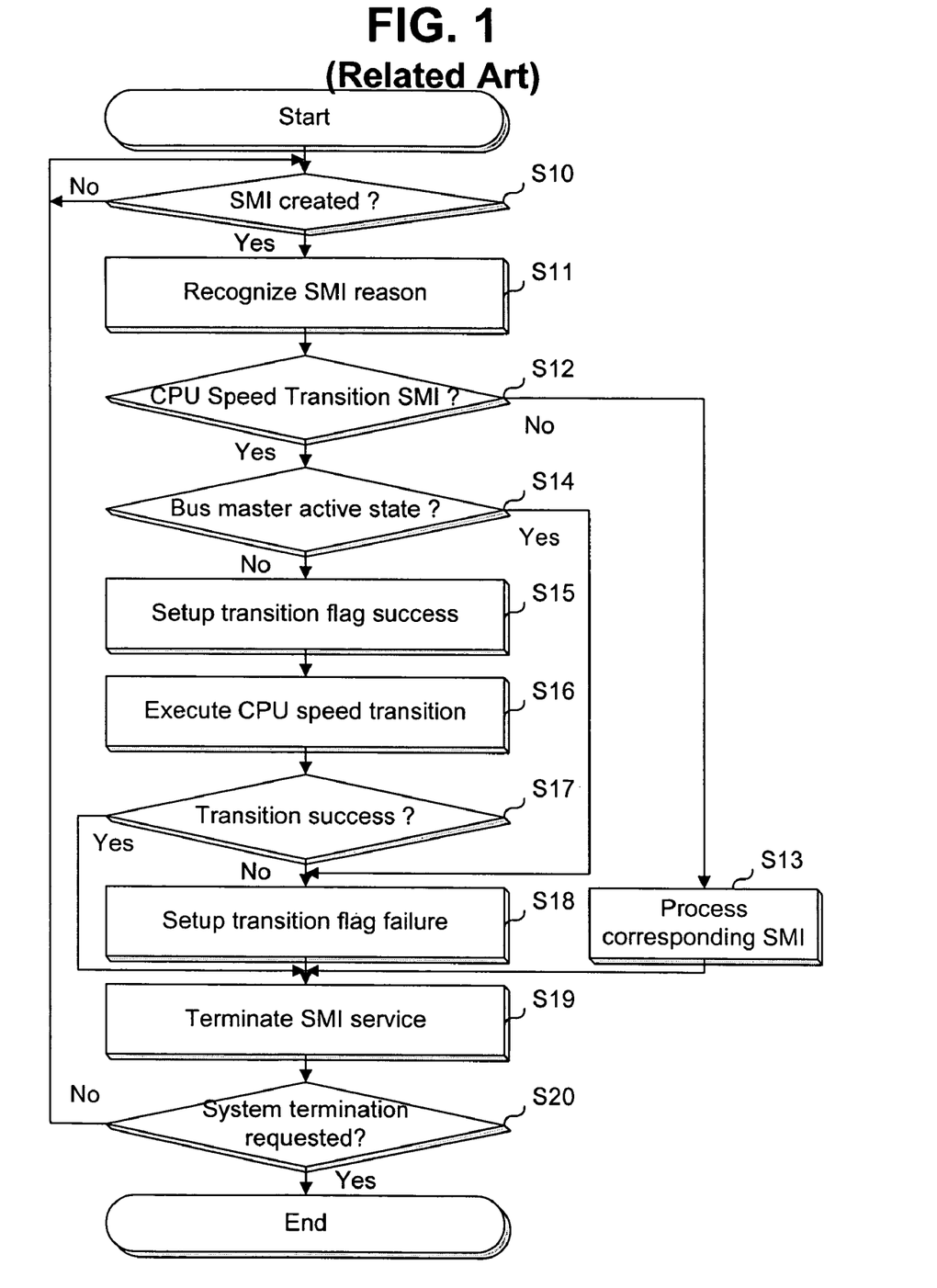
FIG. 1 is a flow chart illustrating a related art CPU speed transition control method for a computer system.

FIG. 1 is a flow chart illustrating a related art CPU speed transition control method applied to a computer system. For example, if an SMI (System Management Interrupt) signal occurs in a notebook computer at step S10, a system BIOS of the notebook computer recognizes why the SMI signal has occurred at step S11.

Unless the reason for the SMI signal occurrence is to perform a transition of Geyserville CPU speed at step S12, the system BIOS processes a prescribed operation corresponding to the SMI signal at step S13. Otherwise, if the SMI signal has occurred to perform Geyserville CPU speed transition either from high speed to low speed or from low speed to high speed, it is determined whether a bus master device in the notebook computer is in an active state at step S14.

If the bus master device is not in the active state, the system BIOS sets a transition flag to a first prescribed value indicative of transition success at step S15, and increases or decreases the Geyserville CPU speed at step S16.

The system BIOS determines whether the Geyserville CPU speed transition is normally executed at step S17. In this case, if the Geyserville CPU speed transition is abnormally executed, the system BIOS sets a transition flag to a second prescribed value indicative of transition failure at step S18, and terminates the SMI service operation at step S19.

If it is determined that the bus master device is in the active state at step S14, the system BIOS sets the transition flag to the second prescribed value indicative of transition failure without performing the Geyserville CPU speed transition at step S18. Then, the system BIOS terminates the SMI service operation at step S19 so that it can prevent a computer system from hanging up. Thereafter, the system BIOS repeats the above-described steps until receiving a system-off command at step S20.

The reason why the computer system hangs up is as follows. When the system BIOS performs CPU speed transition when the bus master device (from among several system devices) is in an active state, the CPU is not in a normal mode while performing the CPU speed transition, and the system BIOS cannot continuously perform the bus master device's current operations any longer. Accordingly, the computer system hang up is avoided by preventing the CPU speed transition when the bus master device is active.

As described above, the related art apparatus and method for controlling CPU speed transition have various disadvantages. For example, if the bus master device is in the active state and the system BIOS immediately terminates the SMI service without performing the CPU speed transition, the computer system does not hang up, however, the SMI service is terminated because of transition failure. Therefore, it is difficult or impossible for the system BIOS to normally perform the CPU speed transition.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus and method for controlling CPU speed transition between high and low speeds.

Another object of the present invention to provide an apparatus and method for controlling CPU speed transition, which terminates an SMI service without performing a control operation needed for CPU speed transition when a bus master device is in an active state.

Another object of the present invention is to provide an apparatus and method for controlling CPU speed transition, which terminates an SMI service without performing a control operation needed for CPU speed transition when a bus master device is in an active state, but repeatedly generates an event needed for the CPU speed transition.

Another object of the present invention is to provide an apparatus and method for controlling CPU speed transition, which terminates an SMI service without performing a control operation needed for CPU speed transition when a bus master device is in an active state, but repeatedly generates an event needed for the CPU speed transition, for example, a watchdog timer SMI and an embedded controller SMI, at regular time intervals to result in normal CPU speed transition.

In accordance with one aspect of the present invention, at least the above and other objects can be accomplished in a whole or in part by providing a method for controlling CPU speed transition that includes receiving a System Management Interrupt (SMI) signal, determining whether a bus master device is in an active state when the SMI signal is for performing CPU speed transition and canceling the CPU speed transition operation when the bus master device is in the active state and generating at prescribed intervals a retry SMI signal.

To further achieve the above objects and advantages in a whole or in part in accordance with another aspect of the present invention, there is provided a portable computer that includes a CPU configured to operate using at least two speeds, a controller configured to perform a prescribed operation to transition between the at least two speeds of the CPU, interrupt occurrance reason recognition unit for recognizing an occurrence reason of an interrupt signal, active state checking unit for checking an active state of a predetermined device and interrupt generating unit for creating a second interrupt signal to retry the prescribed operation for the CPU speed transition when the interrupt occurrence reason recognition unit determines that a first interrupt signal is created for the CPU speed transition and the active state checking unit determines that the predetermined device is in the active state.

To further achieve the above objects and advantages in a whole or in part in accordance with another aspect of the present invention, there is provided an apparatus that includes an interrupt receiver configured to receive interrupt signals and an interrupt generator coupled to the interrupt receiver and configured to generate a second interrupt signal to retry a prescribed operation needed for CPU speed transition when a first interrupt signal for the CPU speed transition is received and a bus master device is in an active state.

To further achieve the above objects and advantages in a whole or in part in accordance with another aspect of the present invention, there is provided an article including a machine-readable storage medium containing instructions for controlling CPU speed transition in a computer system, said instructions, when executed in the computer system, causing the computer system to receive an System Management Interrupt (SMI) signal, determine whether a bus master device is in an active state when the SMI signal is a first SMI CPU speed transition signal and cancel the CPU speed transition operation when the bus master device is in the active state and generate at predetermined intervals an event.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
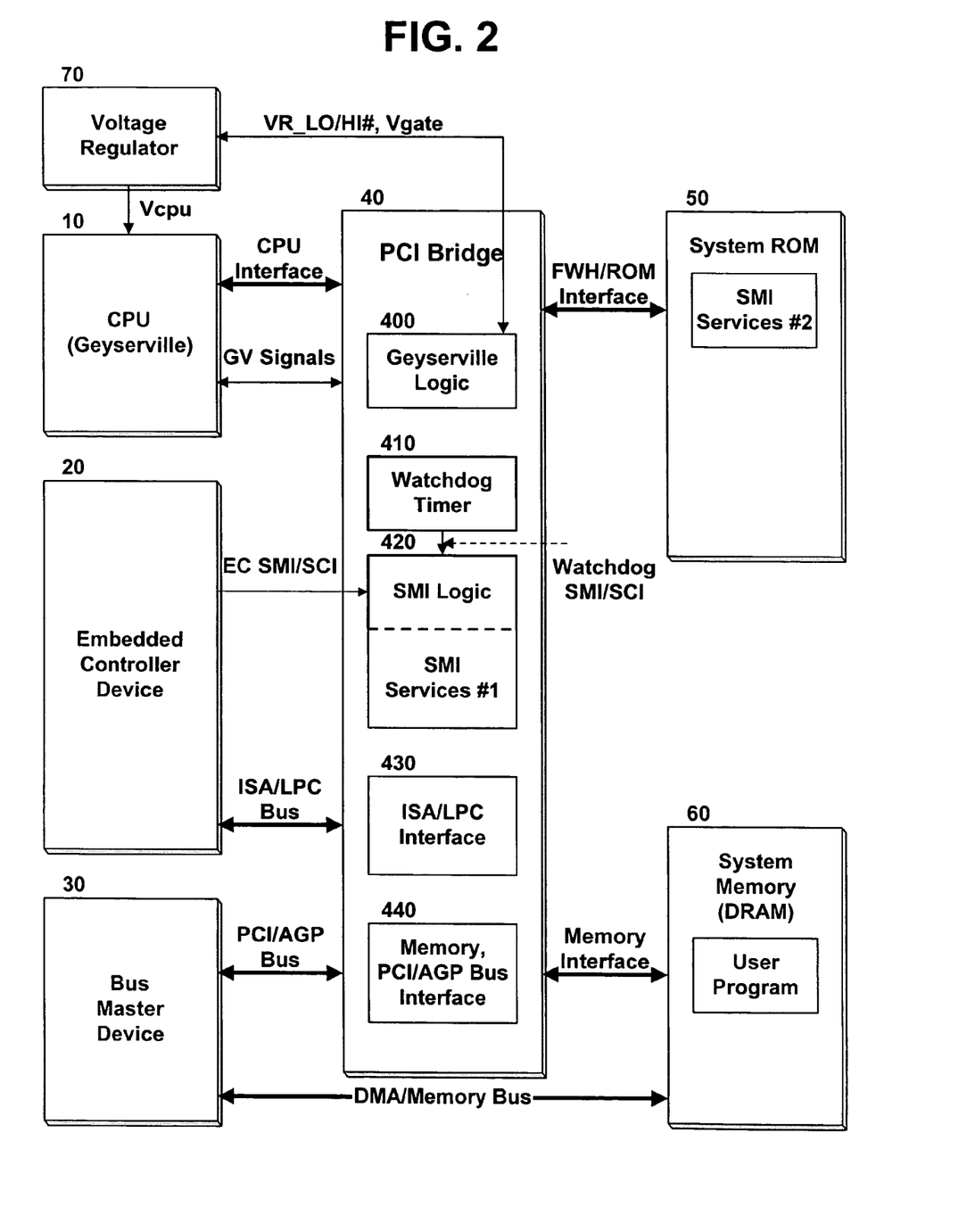
FIG. 2 is a block diagram illustrating a preferred embodiment of a computer system including a CPU speed transition control apparatus in accordance with the present invention.

FIG. 2 is a block diagram illustrating a computer system to which embodiments of CPU speed transition control apparatus and methods in accordance with the present invention can be applied. For example, a computer system such as a notebook computer can include a CPU 10, an embedded controller device 20, a bus master device 30, a PCI (Peripheral Component Interconnect) bridge 40, a system ROM 50, and a system memory 60.

The PCI bridge 40 can include Geyserville logic 400, a watchdog timer 410, SMI (System Management Interrupt) logic 420, an ISA/LPC logic 430, and a PCI/AGP interface 440. The system memory 60 using DRAM can store a user program, etc.

The CPU 10 may be one of a variety of CPUs where Intel Corporation's SpeedStep or Geyserville technology is supported. For example, the CPU 10 may be a mobile Intel Pentium 4 processor, combined with Intel SpeedStep Technology (also called Geyserville technology) or its similar equivalents, such that it can support Enhanced Intel SpeedStep Technology. In this case, it should be noted that the SpeedStep technology is equal to that of the Geyserville technology.

The SpeedStep technology enables the CPU 10 to perform an automatic switching function between two core frequencies according to CPU demand. For example, the CPU demand may be CPU load information. The switching function of the operation frequency of the CPU 10 can be executed without either resetting the CPU 10 or changing a system bus frequency. The Mobile Intel Pentium 4 processor operates in two modes, e.g., a maximum performance mode and a battery optimized mode. The Mobile Intel Pentium 4 processor may further support at least one mode other than the two modes.

GV signals shown in FIG. 2 are composed of a variety of signals, for example, G_GMI, G_NMI, GM_INIT, G_INTR, G_STPCL#, and LO/HI#, etc. In response to individual signals, the CPU 10 can execute a transition of its own operation frequency and applied voltage. The reception voltage of the CPU 10 generated from a voltage regulator 70 can be controlled by VR_LO/HI# and Vgate signals received from the Geyserville logic 400. After Microsoft Windows XP has been installed in a computer system such as a notebook computer and a power-supply management item contained in a Windows' Control Panel has been set to an adaptive mode, if a power-supply source is changed in the direction either from an AC adapter to a battery or from the battery to the AC adapter, and if either a battery lifetime or an CPU use information changes, the Geyserville logic 400 can automatically perform CPU speed transition either in the direction from high speed to low speed, or in the other direction from low speed to high speed.

The transition operation may also be performed by Microsoft Windows XP. Windows XP can execute a unique built-in support program needed for Processor Performance Control. The unique built-in support program can be a Native Processor Performance Control program. The Native Processor Performance Control program may implement a variety of technologies such as an Enhanced Intel SpeedStep Technology, etc., therein.

The unique built-in support program needed for Processor Performance Control in Windows XP can be composed of two components, e.g., a Processor Performance Control component and a Processor Performance Control Policy. The Processor Performance Control component is a prescribed function needed for changing a performance state. Windows XP can execute the Processor Performance Control function using either the Legacy SMI Interface prescribed by Intel Corporation or the Processor Objects prescribed in the Advanced Configuration and Power Interface (ACPI) standard. In this case, the Legacy SMI Interface and the Processor Objects are associated with the above-described SpeedStep technology.

The Processor Performance Control Policy component is preferably the set of behavior rules used to determine the appropriate performance state to be used. Windows XP has associated the Processor Performance Control Policy with a prescribed power scheme, and has defined four control policies needed for the Processor Performance Control. These four Control policies are composed of a constant mode for enabling a processor to always run in a lowest performance state, an adaptive mode for enabling the processor to select a performance state on the basis of CPU demand, a degrade mode for enabling the processor to start in the lowest performance state and use a linear performance reduction function (i.e., a stop clock throttling function) in proportion to a battery discharge time, and a none-mode for enabling the processor to always run in a highest performance state. However, the present invention is not intended to be so limited. For example, the number of the above control policies may also be increased or decreased on the basis of another reference.

The SMI signal can be created as an event needed for CPU operation frequency transition based on the Intel SpeedStep Technology. In this case, there can be a variety of items associated with the SMI signal occurrence, for example, CPU use amount, temperature (e.g., thermal conditions), and battery life, etc. Therefore, in the case where the CPU 10 is a processor where more than two frequencies are supported and predetermined conditions for one of the aforementioned items are satisfied, preferably the CPU 10 can automatically perform a transition of its own operation frequency. It should be noted that the above-described items may also be changed to another item, and the predetermined conditions for corresponding items may be deleted or further added if needed.

An exemplary transition CPU speed based on the CPU use amount will now be described. In the case of using MS-Word, the percentage of CPU use is preferably in the range from 20% to 40%. In the case of reproducing a DVD (Digital Versatile Disc), the percentage of CPU use is preferably substantially 100%. Therefore, according to the CPU workload, the CPU speed transition can be automatically or directly executed using Windows XP. For example, if the percentage of the CPU use is equal to or higher than 95%, a CPU operation frequency transition to a highest or the Maximum Performance Mode can be automatically performed. Otherwise, if the percentage of CPU use is equal to or lower than 75%, a CPU operation frequency transition to the Battery Optimized Mode can be automatically performed.

In the meantime, if the percentage of CPU use is 95% in a specific CPU capable of supporting more than four frequency modes, the CPU speed can be automatically switched to the highest operation frequency. If the percentage of CPU use is in the range from 75% to 94% in the same CPU capable of supporting more than four frequency modes, the CPU speed can be automatically switched to the second-highest operation frequency. If the percentage of CPU use is in the range from 40% to 74% in the same CPU capable of supporting more than four frequency modes, the CPU speed can be automatically switched to the third-highest operation frequency. If the percentage of CPU use is lower than 40% in the same CPU capable of supporting more than four frequency modes, the CPU speed is automatically switched to the lowest operation frequency. For example, the SMI handler denoted by "SMI Service #2" contained in the system ROM shown in FIG. 2 can automatically perform the CPU speed transition according to the CPU use information, for example, as described above.

An exemplary CPU speed transition based on the thermal conditions will now be described. For example, if the CPU or peripheral chipsets overheat because of an application load factor, the thermal event SMI signal occurs, and the CPU's operation frequency or reception voltage can be automatically regulated to maintain the temperature of the CPU at a temperature below a predetermined temperature.

If the CPU temperature increases, the SMI handler denoted by "SMI Service #2" in the system ROM 50 can perform a transition from a highest or maximum performance mode to a lower performance or the battery optimized mode. However, if the CPU temperature is not lower than a predetermined temperature, e.g., if the CPU continues to overheat after the CPU has entered the battery optimized mode, the system BIOS or Windows XP may perform a throttling mode to cool the CPU 10.

The throttling mode can enable a clock signal applied to the CPU to be stopped at a predetermined rate while the CPU is continuously operated at a fixed frequency (i.e., a high or low frequency) in such a way that the CPU speed is controlled. This throttling mode is different from the Speed-Step transition method.

Further, provided that the CPU supports more than four operation frequencies, the system BIOS may gradually control the operation frequencies of the CPU 10 until the CPU 10's temperature reaches a desired temperature, instead of performing a transition to the throttle mode. For example, if the CPU temperature is equal to or higher than 100° C. on the assumption that a desired CPU temperature is 70° C., the CPU speed can be transitioned from the highest operation frequency mode to the second-highest operation frequency mode using the thermal event SMI signal. If the CPU temperature is in the range from 90° C. to 99° C. on the assumption that the desired CPU temperature is 70° C., the CPU speed can be transitioned to the third-highest operation frequency mode. If the CPU temperature is in the range from 71° C. to 89° C. on the assumption that the desired CPU temperature is 70° C., the CPU speed is automatically transitioned to the lowest operation frequency mode.

An exemplary CPU speed transition based on battery life will now be described. For example, if a user sets a power management item for example in Windows XP to the degrade mode, the CPU can first start in a lowest performance state, and then perform the stop clock throttling function for executing linear performance reduction in proportion to a battery discharge time using or responsive to the SMI signal. In this case, a CPU supporting more than two operation frequencies can automatically or directly control transition movements between the more than two operation frequencies based upon the battery discharge time.

The SMI signal has been created due to a variety of reasons, for example, a change of CPU use amount, switching between AC adapter and battery power sources, reduction of battery lifetime, and temperature variation. However, the present invention is not intended to be so limited. Further, even in the case where the user sets the power management item in Windows XP to either one of constant mode, none mode, adaptive mode, and degrade mode as a runtime mode, the SMI signal can also be created. In addition, the above described reasons of SMI signal occurrence may be deleted or new reasons may be added. If necessary, the SMI signal occurrence conditions may be changed to another conditions.

Further, in preferred embodiments according to the present invention, SMI signal is intended to include at least both types of hardware generated and software generated events or interrupts. Accordingly, as described, signals are intended to include both hardware signals, application generated signals and software signals, packets or registers.

In the computer system shown in FIG. 2, the embedded controller device 20, the PCI bridge 40, Windows XP or the like can check the above created events, and thereby create an SMI signal needed or used for the CPU speed transition. The SMI logic 420 preferably executes an SMI service operation corresponding to the above-created SMI signal, and operations of the SMI logic 420 will now be described.

Embodiments of CPU speed transition control methods according to the present invention can be applied to a computer system such as a notebook computer having the above-described configuration shown in FIG. 2. Provided that the bus master device is in an active state, SMI control such as the SMI logic 420 can cancel a prescribed control operation needed for CPU speed transition, and control at a designated time creating an SMI signal (e.g., by a watchdog timer SMI signal or an embedded controller SMI signal) needed for CPU speed transition preferably at regular time intervals.

The SMI logic 420 can re-check whether the bus master device is in the active state (e.g., by referring to the periodically created watchdog timer SMI or embedded controller SMI signal). If the bus master device is not in the active state, a CPU speed transition operation can then be executed.

Figure 3:
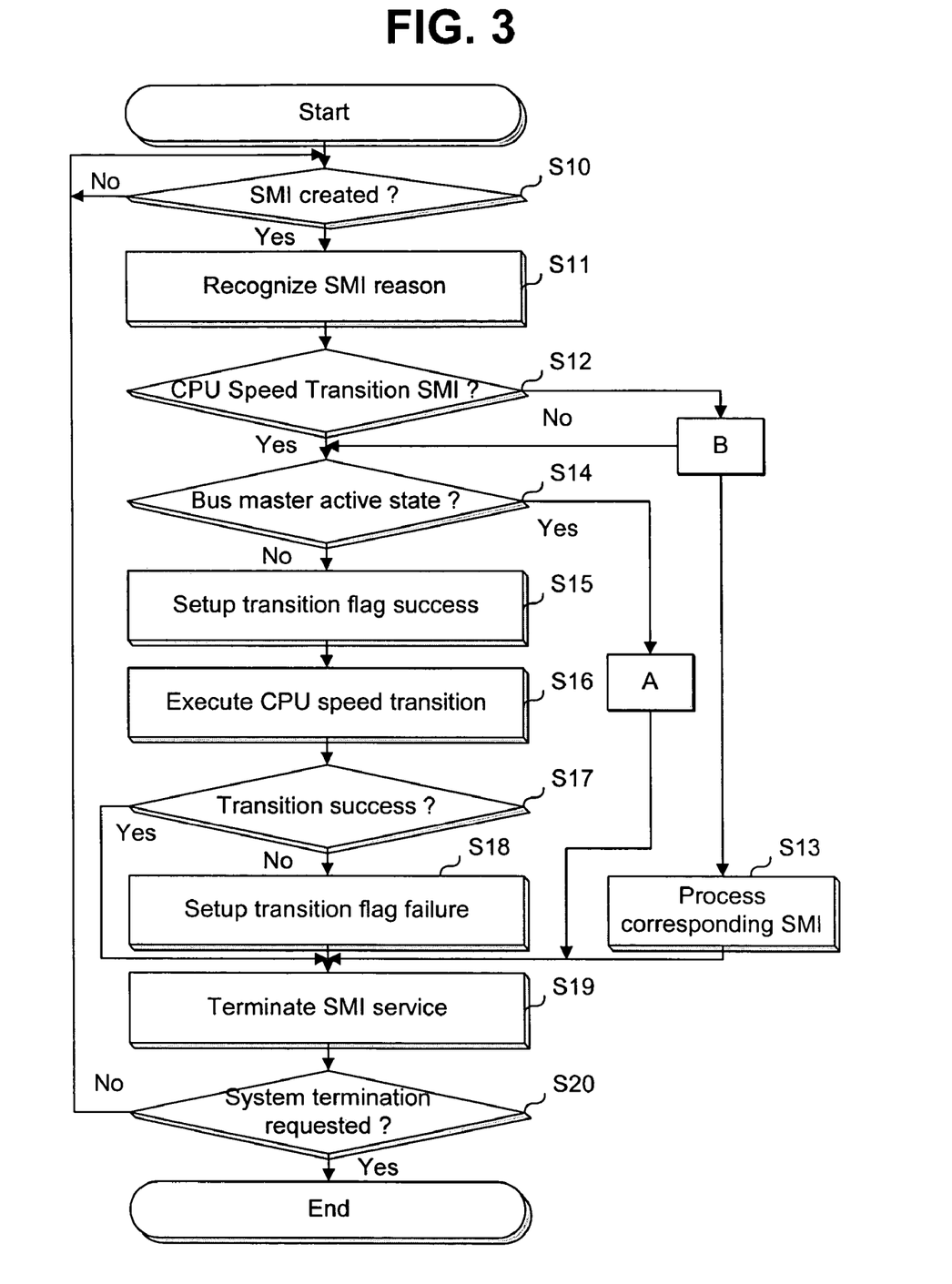
FIGS. 3 and 4 are flow charts illustrating a preferred embodiment of CPU speed transition control methods in accordance with the present invention.
Figure 4:
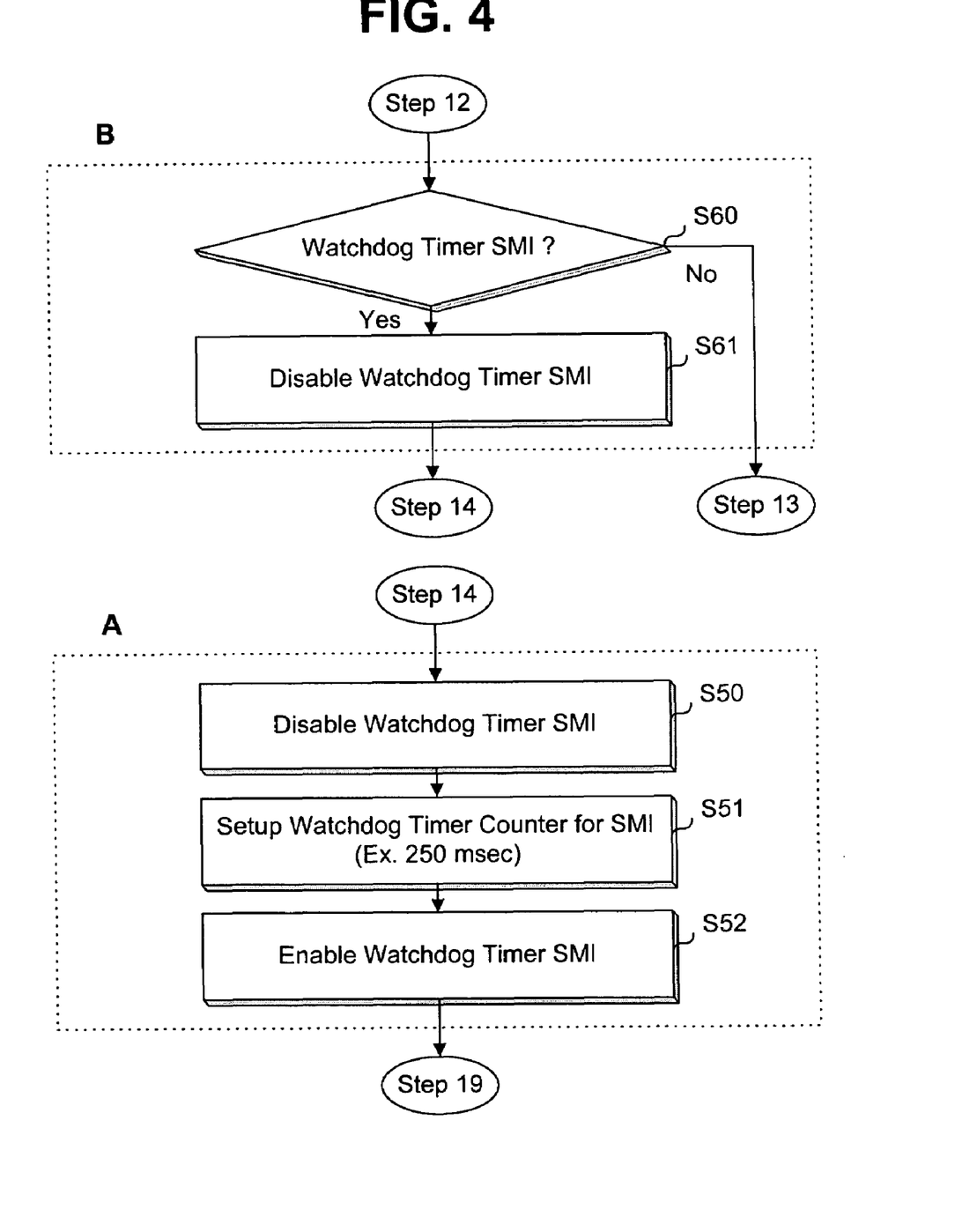

FIGS. 3 and 4 are flow charts illustrating CPU speed transition control methods in accordance with an embodiment of the present invention. The embodiment of the CPU speed transition control method of FIGS. 3-4 can be applied to and will be described using the portable computer of FIG. 2. However, the present invention is not intended to be so limited.

As shown in FIG. 3, after a process starts if the SMI signal is created at step S10, the system BIOS in the notebook computer of FIG. 2 can recognize why the SMI signal is created at step S11 (e.g., the reason for SMI signal occurrence). If it is determined that the SMI signal is created for CPU 10 speed transition at step S12, the system BIOS can determine whether the bus master device 30 is in an active state at step S14.

The SMI signal may be created for a variety of reasons, for example, a change of CPU use amount, switching between AC adapter and battery power sources, reduction of battery lifetime, temperature variation and the like. Further, the SMI signal can also be created where the user sets the power management item in Windows XP to either one of a constant mode, none mode, adaptive mode, and degrade mode as a runtime mode. In addition, the reasons described above for the SMI signal occurrence may also be deleted or new reasons may be added. If necessary, the SMI signal occurrence conditions may also be changed to another conditions.

If it is determined in step S12 that the SMI signal is created for CPU 10 speed transition, the system BIOS can determine whether the bus master device 30 is in the active state, for example, by checking the result of monitoring an active state of individual system devices contained in the system using an arbiter of a bus controller (not shown) contained in the PCI bridge 40.

If it is determined that the bus master device is not in the active state at step S14, the system BIOS can set a transition flag to a prescribed value indicative of transition success at step S15, and increase or decrease the CPU 10's speed at step S16. In this case, the CPU speed transition may also be executed using Native Processor Performance Control for Windows XP.

Thereafter, the system BIOS can determine whether the CPU 10's speed control operation is normally executed at step S17. If the CPU 10's speed control operation has been abnormally executed, the system BIOS can set a transition flag to a prescribed value indicative of transition failure at step S18, and terminate the SMI service operation at step S19. The system BIOS can repeat the above-described steps until receiving a system-off command at step S20.

If it is determined that the bus master device is in an active state at step S14, the system BIOS can disable a previously-setup watchdog timer (e.g., having a period of 2 msec) SMI at step S50, and can newly set a creation period of the SMI signal needed for CPU speed transition to a predetermined period (e.g., a period of 250 msec) at step S51.

Typically, the watchdog timer is a timer for creating interrupt signals at intervals of a predetermined time (e.g., 2 msec). Therefore, the system BIOS can enable the watchdog timer for CPU speed transition at step S52 in order to create interrupt signals at intervals of a new predetermined time (e.g., 250 msec), and terminates the currently-executing SMI service at step S52. Thereafter, the watchdog timer SMI signal can be created at intervals of the above time of 250 msec, such that the SMI service operation is repeatedly executed.

The system BIOS can recognize the reason for SMI occurrence at step S11. If it is determined in step S11 that the SMI signal is created from the newly-setup watchdog timer in order to perform CPU speed transition at step S12 and step S60, the system BIOS can disable the watchdog timer SMI at step S61, and perform successive operations needed to determine whether the bus master device is in the active state at step S14. If the SMI signal has no connection with the above SMI created from the watchdog timer needed for the CPU speed transition, the system BIOS preferably executes a corresponding SMI processing operation at step S13.

In step S61, the watchdog timer and accordingly other interrupts (e.g., SMI) or operations by the watchdog timer are preferably disabled to prevent a computer system hang-up. In other words, the watchdog timer operations are suspended to reduce a possibility of multiple operations, which may not be accurately provided, during repeatedly attempting the CPU speed transition.

In the meantime, if the bus master device is still in the active state after performing the step S61, the system BIOS can cancel the CPU 10's speed transition operation to prevent the computer system from hanging up, and control the watchdog timer to create SMI signals needed for a CPU speed transition retrial at intervals of a predetermined time at steps S50~S52. Otherwise, if the bus master device is not in the active state after performing the step S61, the system BIOS can normally execute the CPU speed transition steps S15~S18.

Thereafter, the system BIOS terminates the SMI service operation at step S19, and can repeat the above-described successive steps until receiving a system-off command at step S20. In this case, as for the SMI signal having been created for CPU speed transition, the SMI handler contained in the system BIOS 50 preferably recognizes the reason for SMI occurrence, performs the SMI service #2 routine contained in the system ROM 50 shown in FIG. 2, or may jump to a prescribed routine stored in the system ROM 50 in association with the SMI service #1 routine contained in the SMI logic 420 of the PCI bridge 40 and may perform the jump routine.

Figure 5:
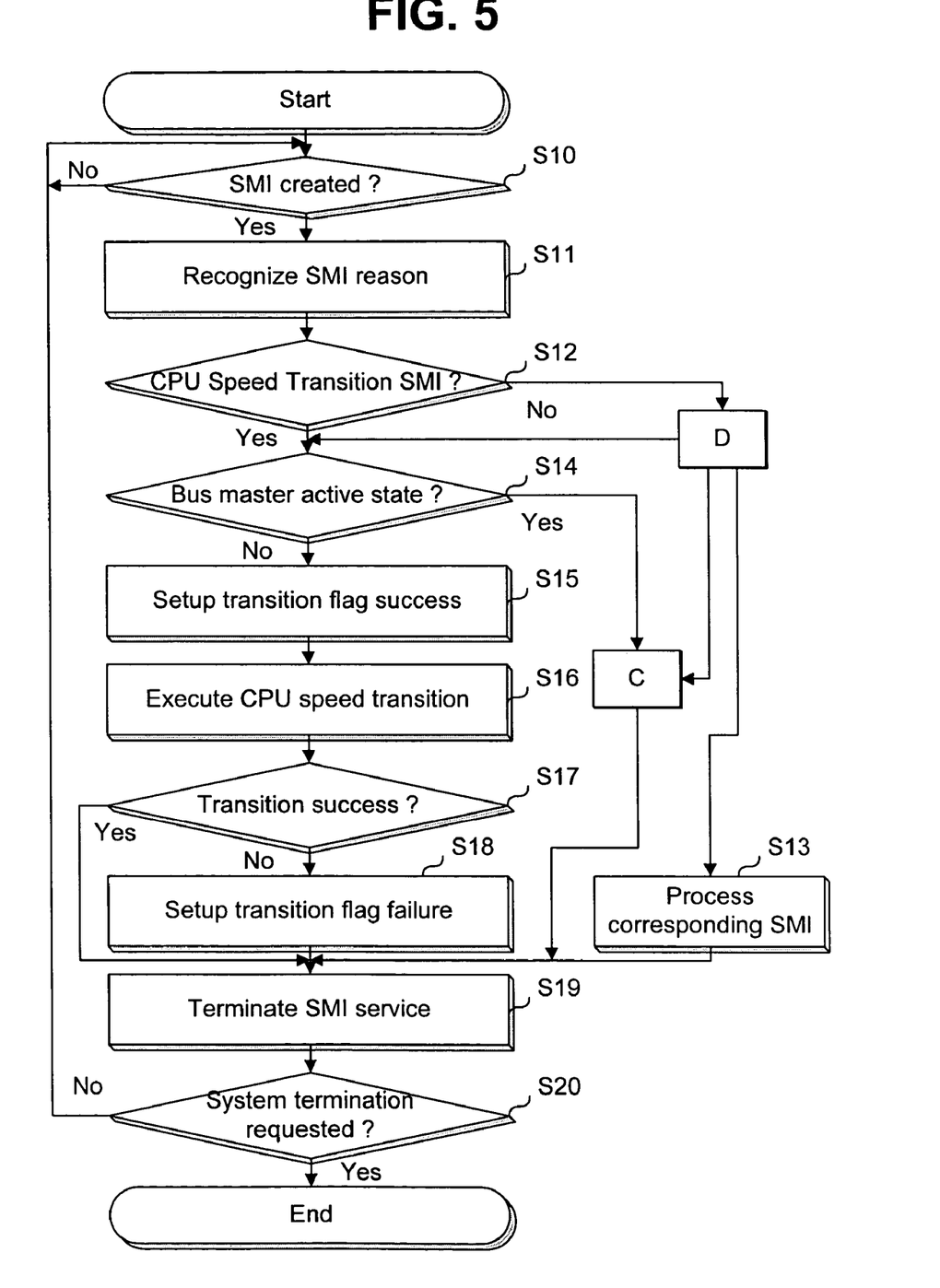
FIGS. 5 and 6 are flow charts illustrating another preferred embodiment of CPU speed transition control methods in accordance with the present invention.
Figure 6:
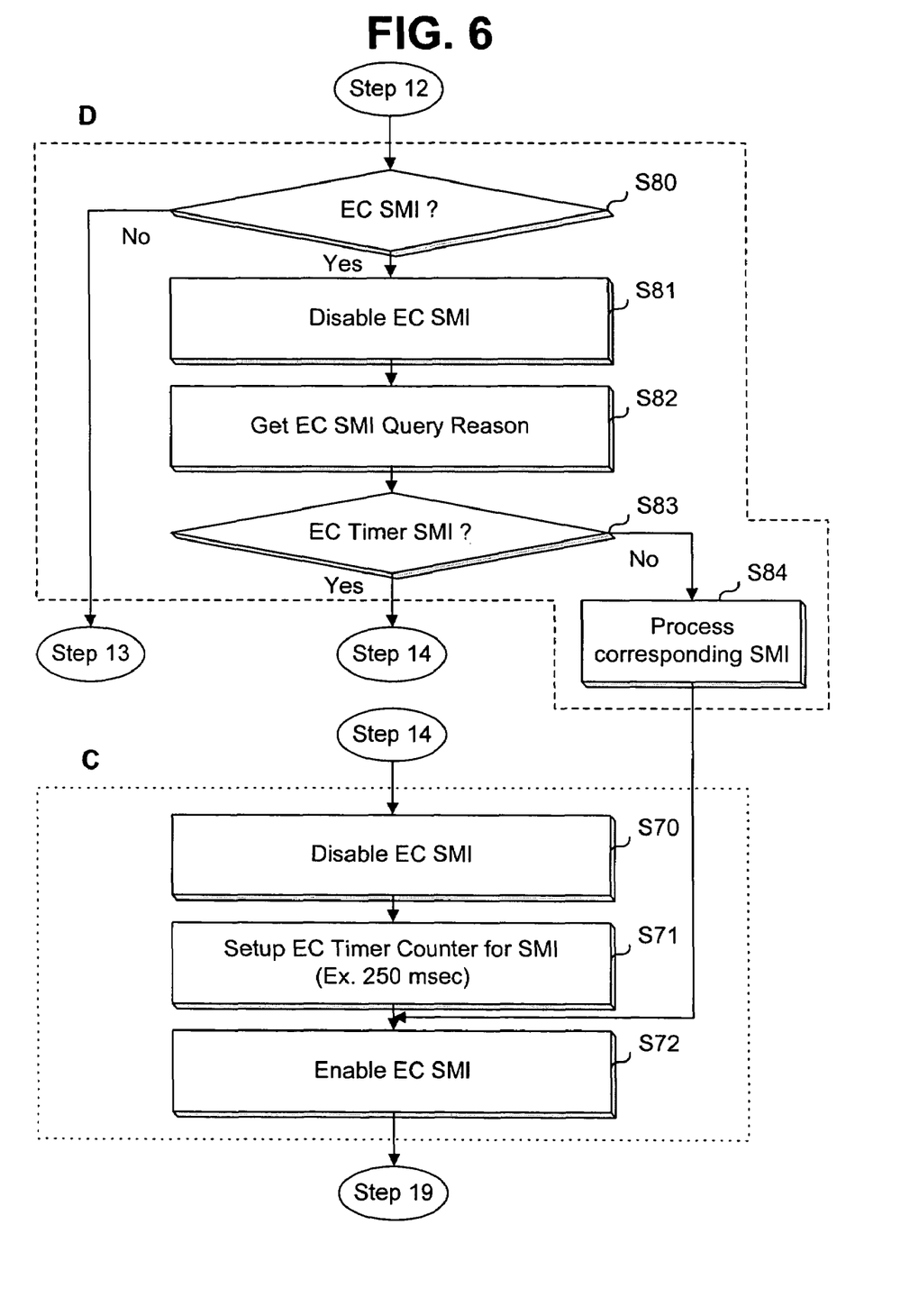

FIGS. 5 and 6 are flow charts illustrating CPU speed transition control methods in accordance with another embodiment of the present invention. The embodiment of the CPU speed transition control method of FIGS. 5-6 can be applied to and will be described using the portable computer of FIG. 2. As shown in FIGS. 5-6, if the PCI bridge 40 of FIG. 2 does not contain the above watchdog timer function, the system BIOS can perform the above-identified CPU speed transition operation using the SMI signal created from the embedded controller device 20.

As shown in FIG. 5, after a process starts if the SMI signal is created at step S10, the system BIOS in the notebook computer can recognize the reason for SMI signal occurrence at step S11. If it is determined that the SMI signal is created for CPU 10's speed transition at step S12, the system BIOS can determine whether the bus master device 30 is in an active state at step S14. In this case, a method for determining whether the bus master device 30 is in the active state and the reason for SMI signal occurrence are preferably similar to the embodiment of FIGS. 3-4.

If it is determined that the bus master device 30 is not in the active state at step S14, the system BIOS can set a transition flag to a prescribed value indicative of transition success at step S15, and increase or decrease the CPU 10's speed at step S16.

Thereafter, the system BIOS can determine whether the CPU 10's speed control operation is normally executed at step S17. If the CPU 10's speed control operation has been abnormally executed, the system BIOS can set a transition flag to a prescribed value indicative of transition failure at step S18, and terminate the SMI service operation at step S19. The system BIOS can repeat the above-described steps until receiving a system-off command at step S20.

If it is determined that the bus master device 30 is in an active state at step S14, the system BIOS can disable previously-setup embedded controller SMIs at step S70, and output a prescribed command for newly setting a creation period of the SMI signal needed for CPU speed transition to a predetermined period (e.g., a period of 250 msec) to the embedded controller device at step S71. In this case, the system BIOS can newly set a period of embedded controller SMI occurrence to the predetermined period (e.g., 250 msec) using an inner timer contained in the embedded controller device 20 shown in FIG. 2 at step S71.

In order to create interrupt signals at intervals of the new predetermined time (e.g., 250 msec), the system BIOS can enable the embedded controller SMI signal needed for CPU speed transition at step S72, and also (e.g., preferably at the same time) terminate the currently-executing SMI service at step S19. Thereafter, the embedded control SMI signal can be created at intervals of the above predetermined time (e.g., 250 msec), such that the SMI service operation is repeatedly executed.

If the embedded controller SMI signal is detected at step S80 as shown in FIG. 6, the system BIOS can disable the embedded controller SMI at step S81, and recognize the reason for the SMI signal occurrence at step S82. If it is determined that the embedded controller SMI signal is created for CPU speed transition at step S83, the system BIOS can repeatedly perform successive operations needed to determine whether the bus master device is in the active state at step S14. However, if the embedded controller SMI signal has no connection with the CPU speed transition, the system BIOS preferably executes a corresponding embedded controller SMI processing operation at step S84, and enables the embedded controller SMI at step S72.

In step S81, the embedded controller and accordingly other interrupts (e.g., SMI) or operations by the embedded controller are preferably disabled to prevent a computer system hang-up. In other words, the embedded controller operations are suspended to reduce a possibility of multiple operations, which may not be accurately provided, during repeatedly attempting the CPU speed transition.

If it is determined that the bus master device is in the active state at step S14, the system can BIOS cancel the CPU 10's speed transition operation to prevent the computer system from hanging up, and control the embedded controller to create SMI signals needed for a CPU speed transition retrial at intervals of a predetermined time at steps S70~S72. Otherwise, if the bus master device is not in the active state, the system BIOS can normally execute the CPU speed transition steps S15~S18.

Thereafter, the system BIOS terminates the SMI service operation at step S19, and can repeat the above-described successive steps until receiving a system-off command at step S20. In a similar process to FIGS. 3 and 4 for the SMI signal having been created for CPU speed transition, the SMI handler contained in the system BIOS 50 preferably recognizes the reason for SMI occurrence, performs the SMI service #2 routine contained in the system ROM 50 shown in FIG. 2, or may jump to a prescribed routine stored in the system ROM 50 in association with the SMI services #1 routine contained in the SMI logic 420 of the PCI bridge 40 and may perform the jump routine.

As described above, embodiments of an apparatus and method for controlling CPU speed transition according to the present invention have various advantages. Embodiments of an apparatus and method for controlling CPU speed transition can cancel a prescribed control operation needed for CPU speed transition if the bus master device is in an active state to reduce or prevent the computer system from hanging up. Further, embodiments can retry the CPU speed transition control operation, for example, at intervals of a predetermined time so that a normal CPU speed transition can be established.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling CPU speed transition, comprising:
    receiving a System Management Interrupt (SMI) signal;
    determining whether a bus master device is in an active state when the SMI signal is for performing CPU speed transition; and
    canceling the CPU speed transition operation when the bus master device is determined to be in the active state and generating a retry SMI signal at prescribed intervals, wherein the retry SMI signal generated at the prescribed intervals is one of a watchdog timer SMI signal and an embedded control SMI signal to retry the CPU speed transition operation.

2. The method of claim 1, further comprising performing the CPU speed transition operation when the bus master device is not in the active state.

3. The method of claim 1, wherein the determining comprises:
    disabling occurrences of additional watchdog timer SMI signals when the received SMI signal is the watchdog timer SMI signal to retry the CPU transition operation; and
    re-determining whether the bus master device is in the active state.

4. The method of claim 1, wherein the determining comprises:
    disabling occurrence of additional embedded controller SMI signals when the received SMI signal is an embedded controller SMI signal to retry the CPU speed transition operation; and
    re-determining whether the bus master device is in the active state.

5. The method of claim 1, wherein the determining comprises:
    performing a prescribed operation corresponding to the received SMI signal when the received SMI signal is not an SMI signal for CPU speed transition, the watchdog timer SMI signal to retry the CPU speed transition operation or the embedded controller SMI to retry the CPU speed transition operation.

6. The method of claim 1, wherein the SMI signals are at least one of a hardware generated signal and an application program generated signal.

7. A portable computer, comprising:
a CPU configured to operate using at least two speeds;
a controller configured to perform a prescribed operation to transition between the at least two speeds of the CPU;
interrupt occurrence reason recognition means for recognizing an occurrence reason of an interrupt signal;
active state checking means for checking an active state of a predetermined device; and
interrupt generating means for creating a second interrupt signal to retry the prescribed operation for the CPU speed transition when the interrupt occurrence reason recognition means determines that a first interrupt signal is for the CPU speed transition and the active state checking means determines that the predetermined device is in the active state, and the interrupt generating means creates the second interrupt signal based on a predetermined timer contained in the computer.

8. The portable computer of claim 7, wherein the first interrupt signal for the CPU speed transition is responsive to a change of CPU use amount, switching between AC adapter and battery power sources, reduction of battery lifetime, runtime setup of a user and temperature variation.

9. The portable computer of claim 7, wherein the predetermined timer comprises a watchdog timer or an inner timer of an embedded controller.

10. The portable computer of claim 7, wherein the second interrupt signal is created at intervals of a predetermined time determined by a system BIOS.

11. The portable computer of claim 7, wherein the predetermined device comprises a bus master device.

12. The portable computer of claim 7, wherein the second interrupt is repeatedly generated until the CPU transition is performed, and wherein the portable computer comprises a notebook computer.

13. An apparatus, comprising:
an interrupt receiver configured to receive interrupt signals; and
an interrupt generator coupled to the interrupt receiver and configured to generate a second interrupt signal to retry a prescribed operation needed for CPU speed transition when a first interrupt signal for the CPU speed transition is received and a bus master device is in an active state, and the interrupt generator generates the second interrupt signal based on a predetermined timer contained in the apparatus.

14. The apparatus of claim 13, wherein the predetermined timer comprises at least one of a watchdog timer and an inner timer of an embedded controller.

15. The apparatus of claim 13, wherein the second interrupt signal is created at intervals of a predetermined time determined by a system BIOS.

16. The apparatus of claim 13, wherein the apparatus is in a notebook computer.

17. The apparatus of claim 13, wherein the interrupt signals are one of hardware interrupts and software interrupts.

18. An article including a machine-readable storage medium containing instructions for controlling CPU speed transition in a computer system, said instructions, when executed in the computer system, cause the computer system to:
receive an System Management Interrupt (SMI) signal;
determine whether a bus master device is in an active state when the SMI signal is a first SMI CPU speed transition signal; and
cancel the CPU speed transition operation when the bus master device is in the active state and generate an event at predetermined intervals, wherein the generated event is one of a watchdog timer SMI signal and an embedded control SMI signal to retry the CPU speed transition operation.

19. The article of claim 18, wherein the event is a second SMI CPU speed transition signal.

20. The article of claim 19, wherein the event is one of a hardware interrupt and a software interrupt.

* * * * *